Patented May 6, 1952

2,595,852

UNITED STATES PATENT OFFICE 2,595,852

PROCESS FOR SPRAY DRYING SOLUBLE FUSIBLE POLYMERS OF UNSATURATED ESTERS

Francis C. Hopper, Oakland, and Quentin T. Wiles, Lafayette, Calif., assignors to Shell Development Company, San Francisco, Calif., a corporation of Delaware No Drawing. Application June 20, 1949, Serial No. 100,294

19 Claims. (Cl. 260—78.4)

This invention relates to the drying of heat-reactive polymers and to the products produced thereby. More particularly, the invention relates to a process for converting heat-reactive polymers of unsaturated esters of polycarboxylic acids into dry finely-divided solid particles, to the dry powders produced thereby, and to the use of these powders in the preparation of various molding compositions.

Specifically, the invention provides an economical and highly efficient process for converting heat-reactive polymers of unsaturated esters of polycarboxylic acids into dry finely-divided solid particles, which comprises preparing a polymer-monomer mixture containing at least 90% by weight of the said heat-reactive polymer, treating this mixture with a volatile solvent, such as acetone, preferably adding a polymerization catalyst thereto, and then projecting the resulting solution in finely-divided form into a current of relatively dry gas heated to a relatively high temperature. The invention further provides powdered polymers of the unsaturated esters of polycarboxylic acids, preferably having a polymerization catalyst dispersed therein, and improved molding powders and laminates which may be produced therefrom.

Polymers of the unsaturated esters of polycarboxylic acids, such as polymeric diallyl phthalate, may be utilized to produce valuable molding compositions. Moldings prepared from these polymers have a high degree of hardness and dimensional stability and possess good resistance to most organic solvents. The polymers used in the production of the moldings are usually prepared by polymerizing the monomeric unsaturated esters of polycarboxylic acids to the fusible, soluble stage, and then removing some of the unpolymerized monomer from the reaction mixture by solvent extraction. The solvent solution of the heat-reactive polymers produced by this method is then distributed to the molding powder manufacturer who adds the polymerization catalyst, desired lubricants, dyes, etc., mills the mixture and grinds the resulting product to produce the molding powder. This general procedure for producing molding compositions from the above-described polymers has many disadvantages. The handling of the polymers in the volatile solvent solution presents problems of contamination, shipping of the liquid polymers is expensive and is a considerable fire hazard, the milling process conducted by the molding powder manufacturer is long and tedious, and in many cases such a process is unable to obtain a uniform distribution of the catalyst throughout the molding composition.

It is an object of the invention, therefore, to provide a process for converting heat-reactive polymers of unsaturated esters of polycarboxylic acids into dry finely-divided solid particles. It is a further object to provide a process for producing powdered polymers of the above-described esters which possess substantially the same state of cure as the original polymers and may be used directly in the production of molding compositions. It is a further object to provide a process for producing uncured powder polymers of the above-described esters which have a polymerization catalyst uniformly dispersed throughout each polymer particle. It is a further object to provide a process for producing heat-reactive polymers of unsaturated esters of polycarboxylic acids in a form in which they may be shipped safely and economically. It is a further object to provide finely-divided solid particles of the heat-reactive polymers of the unsaturated esters of polycarboxylic acids. It is a further object to provide powdered polymers of the above-described esters which have a polymerization catalyst dispersed therein. It is a further object to provide uncured powdered polymers of the above-described esters which may be easily processed to produce improved molding compositions. It is still a further object to provide a process for producing improved laminates from the above-described powdered polymers. Other objects and advantages of the invention will be apparent from the following detailed description thereof.

It has now been discovered that these and other objects may be accomplished by the process of the invention which comprises preparing a polymer-monomer mixture containing at least 90% of the heat-reactive polymers of the unsaturated esters of the polycarboxylic acids, treating this mixture with a volatile organic solvent, such as acetone, preferably adding a polymerization catalyst thereto, and then projecting the resulting solvent solution in finely-divided form into a current of relatively dry gas heated to a relatively high temperature. The powdered polymers produced by this process possess substantially the same state of cure as the original heat-reactive polymers and may be used directly in the preparation of improved varnishes, laminates, and molding powders as described hereinafter. When the polymerization catalyst is included in the initial partial polymer mixture the catalyst appears in the powdered polymer substantially undiminished in its activity and is uniformly distributed throughout each polymer particle.

The discovery that these polymers could be dried in this manner without undergoing any substantial change in their state of cure was indeed surprising for it is known that heat-reactive polymers of this type which possess free ethylenically unsaturated linkages are quite sensitive to heat, particularly in the presence of peroxide polymerization catalysts, and when placed under these conditions for even a short period of time it would be expected that the cure of the polymer would be greatly enhanced so as to destroy the value of the polymers in the production of molding compositions. It is known also that polymerization catalysts, such as peroxides, not only are volatile at the temperatures which must be used but also decompose rapidly.

As employed throughout the specification and claims the expression "unsaturated esters of polycarboxylic acids" is meant to include the esters of unsaturated alcohols possessing at least one polymerizable ethylenic linkage somewhere in the molecule, preferably not more than four carbon atoms removed from the hydroxyl group, and polycarboxylic acids at least two carboxyl groups of which have been esterified with the said unsaturated alcohols.

The unsaturated alcohols used in producing the above-described esters may be monohydric or polyhydric and may be substituted with aromatic, alicyclic or aliphatic radicals which in turn may be substituted with non-interfering substituents, such as halogen atoms, alkoxy radicals, carbalkoxy radicals, and the like. Examples of such alcohols are allyl alcohol, methallyl alcohol, 3-buten-1-ol, 4-chloro-3-buten-1-ol, 4-hexen-1-ol, 5-cyclohexyl-3-hexen-1-ol, 3-acetoxy-5-hexen-1-ol, and 3-methyl-2,4-hexadien-1-ol.

A preferred group of unsaturated alcohols are the monohydric alcohols having the ethylenic linkage in the beta,gamma position in relation to the terminal hydroxyl group. This group of alcohols is often referred to as "allyl-type" alcohols. These alcohols may be exemplified by allyl alcohol, methallyl alcohol, ethallyl alcohol, chloroallyl alcohol, 3-cyclohexyl-2-propen-1-ol, 2-isopropyl-2-propen-1-ol, 2-buten-1-ol, 2-phenyl-2-buten-1-ol, 3-acetoxy-2-propen-1-ol, and 4-bromo-2-hexen-1-ol. Particularly preferred unsaturated alcohols are the beta,gamma-monoethylenic, monohydric aliphatic alcohols, preferably containing from three to ten carbon atoms. Examples of the particularly preferred alcohols are allyl alcohol, methallyl alcohol, ethallyl alcohol, 2-penten-1-ol, 2-hexen-1-ol, 2-isopropyl-2-buten-1-ol, 3-ethyl-2-penten-1-ol, and 2-octen-1-ol.

The polycarboxylic acids may be saturated, unsaturated, aliphatic, aromatic or alicyclic and may be substituted with non-interfering substituents, such as halogen atoms, sulfate and nitrate radicals, ether and ester radicals, and the like. Examples of the polycarboxylic acids are malonic acid, succinic acid, gluteric acid, adipic acid, suberic acid, sebacic acid, glutaconic acid, maleic acid, fumaric acid, alpha,beta-dibutylsuccinic acid, alpha-ethylglutaric acid, 2-octenedioic acid, 2,5-heptadienedioic acid, 1,1,5-pentanetricarboxylic acid, tricarballylic acid, phthalic acid, isophthalic acid, terephthalic acid, hemimellitic acid, trimellitic acid, mellophanic acid, tetrachlorophthalic acid, dibromoterephthalic acid, and 2-nitrophthalic acid.

The preferred polycarboxylic acids to be used in producing the unsaturated esters are the aromatic polycarboxylic acids having the carboxyl groups attached directly to the aromatic ring. Examples of such acids are phthalic, isophthalic, terephthalic, naphthalene dicarboxylic, dimethyl phthalic, dichlorophthalic, tetrachlorophthalic, dibromoterephthalic, and the like acids.

A single polycarboxylic acid may be esterified with a single unsaturated alcohol, or a mixture of one or both reactants may be employed. Examples of the unsaturated esters are diallyl phthalate, dimethallyl phthalate, vinyl allyl phthalate, triallyl trimellitate, dichloroallyl succinate, divinyl adipate, 2-butenyl allyl malonate, allyl crotyl sebacate, methallyl allyl tetrachlorophthalate, and diethallyl isophthalate.

The term "polymer" as used throughout the specification and claims is meant to include the homopolymers and copolymers of the above-described esters as well as the copolymers of the esters with other polymerizable unsaturated organic compounds. Ordinarily, for optimum results no more than about 25% of the other polymerizable compounds should be employed, and in some cases the amount should not exceed about 10%.

Typical copolymerizable compounds are those containing in the molecule a single polymerizable ethylenic linkage, such as styrene, vinyl halide, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages, such as unsaturated aliphatic polyesters of saturated polybasic acids, polyhydric alcohol esters of unsaturated organic acids, and esters of unsaturated monohydric alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of copolymerizable compounds consists of those having in the molecule two or more, preferably two, conjugated unsaturated polymerizable carbon-to-carbon linkages, such as conjugated butadiene, conjugated chlorobutadiene, isoprene, the other pentadienes, the conjugated hexadienes, their homologues, analogues and suitable substitution products. Particularly valuable copolymers are those diesters of aromatic dicarboxylic acids with one or more allyl-type diesters of dicarboxylic acids containing in the molecule an ether linkage positioned between the carboxy groups. An example of such ether-containing dicarboxylic acid esters is diallyl diglycolate.

The above-described unsaturated esters of polycarboxylic acids are known to undergo polymerization in a series of steps or stages. When the monomeric esters are exposed to polymerization conditions they first form a polymer that is soluble and fusible. If the polymerization conditions are continued the soluble, fusible polymer is converted to a gel which is then subsequently converted to an insoluble, infusible resin. The "heat-reactive" polymers utilized in the process of the invention are the soluble, fusible polymers obtained in the first stage of the above-described polymerization process.

The preferred method for the preparation of these heat-reactive polymers comprises heating the monomeric material in the presence or absence of polymerization catalysts and interrupting the process before it has reached the gel formation stage. Catalysts that may be employed in this process may be exemplified by benzoyl peroxide, barium peroxide, sodium peroxide, the alkali metal perborates and persulfates, tetralin peroxide, olefin peroxides, acetyl peroxides, acetone peroxide and the like. For diallyl phthalate, tertiary butyl hydroperoxide is preferred; ditertiary butyl peroxide and hydrogen peroxide have been used. The amount of the catalyst employed will vary with the various conditions but will generally be between 1% and 5% by weight of the material being polymerized.

The temperature employed in the polymerization may vary over a considerable range depending upon the monomer being polymerized and presence or absence of catalyst. In the presence of catalysts the polymerization temperature will generally range from about 50° C. to 90° C. with a more preferred range varying between 50° C. and 70° C. In the absence of purposely added catalysts temperatures varying from 100° C. to 200° C. are generally desirable. Higher or lower temperatures may be utilized in either case, however, if they are desired or necessary. Atmospheric, superatmospheric or subatmospheric pressures may be used in the polymerization reaction.

The interruption of the polymerization before it has reached the gel formation stage may be accomplished by a variety of different methods, such as discontinuing the heating or destroying the catalyst, for example, by adding a reducing agent to the reaction mixture. The duration of the polymerization may readily be determined by first experimentally determining the refractive index of the esters at the gel point and then following the refractive index of the reaction mixture and arresting the polymerization before the mixture has a refractive index of the determined value. Since the gel point of the polymerizable material may vary slightly from batch to batch, it is preferred practice to provide a substantial margin of safety. Considering the refractive index value of 0.0001 as one unit, polymerization should generally be arrested from about 20 to 75 units short of the predetermined gel point. Obviously, under some standardized conditions of operation it will be unnecessary to make measurements of the refractive index.

The material to be utilized in the first step of the process of the invention comprises a polymer-monomer mixture containing at least 90% by weight of the heat-reactive polymer of the unsaturated ester, and 10% or less by weight of the monomeric unsaturated ester. In general, the amount of polymer in this mixture will vary from 90% to 97% by weight and the amount of monomer will vary from 10% to 3% by weight. Preferred mixtures contain 94% to 96% polymer and 6% to 4% monomer.

These mixtures may be prepared by merely mixing the relatively pure heat-reactive polymer with the desired amount of monomer, or it may be prepared from the reaction mixture in which the partial polymer has been prepared by removing the unreacted monomer contained therein until the monomer content has reached the prescribed level. The removal of the monomer may be accomplished by a variety of methods but is preferably accomplished by extraction. According to this method the reaction mixture described above containing both the heat-reactive polymer and monomer is treated with a substance which is a solvent for the monomer, but a non-solvent for the polymer. Suitable materials for this purpose include alcohols, e. g. methyl alcohol, isopropyl alcohol, the butyl alcohols, the amyl alcohols, dodecanols, etc., ethers, e. g. ethyl ether, isopropyl ether, butyl ethers, etc., and aliphatic hydrocarbons, e. g. hexanes, heptanes, octanes, etc. The extraction is regulated so as to remove only the prescribed amount of monomer, the remaining portion of the reaction mixture being the desired polymer-monomer mixture.

The polymer-monomer mixture is then combined with an organic volatile liquid. These liquids are solvents for both the monomer and polymer and may be exemplified by acetone, methyl ethyl ketone, methyl isobutyl ketone, diamyl ketone, and the like, and mixtures thereof.

The amount of solvent added will depend upon the solids content desired in the resulting mixture. The upper limit of solids content should be that concentration above which the solution cannot be projected in finely-divided form with the particular apparatus employed. In general, the amount of solvent added will be sufficient to produce a mixture containing less than 60% solids. Preferred polymer-monomer solvent solutions contain between 30% and 60% solids. Particularly preferred polymer-monomer solvent solutions contain less than 30% solids, generally between 10% and 30% solids.

Polymerization catalysts are preferably added to the polymer-monomer solvent solution before the said solution is subjected to the drying process. Catalysts which may be used under the proper conditions include: benzoyl peroxide, lauroyl peroxide, acetyl peroxide, benzoyl acetyl peroxide, tertiary butyl hydroperoxide, tertiary butyl perbenzoate, ditertiary butyl peroxide, hydrogen peroxide, cumene hydroperoxide, monochloro ditertiary butyl peroxide, dichloro ditertiary butyl peroxide, ditertiary amyl peroxide, tertiary butyl tertiary amyl peroxide, tertiary butyl peracetate, tertiary butyl ethyl percarbonate, 2,2-bis(tertiary butyl peroxy) butane, 2,2-bis(tertiary butyl peroxy) propane, and tertiary butyl perpelargonate. Mixtures of catalysts may also be utilized. Preferred catalysts to be used are the peroxide catalysts, such as tertiary butyl perbenzoate, tertiary hexyl perbenzoate, 2,2-bis(tertiary butyl peroxy) butane, tertiary butyl perpelargonate, ditertiary amyl peroxide, and the like. The amount of the catalyst added may vary over a considerable range. In general, the amount of the catalyst will vary between 0.1% to 4% by weight of material being polymerized with a preferred range varying from 1% to 3% by weight. Larger or smaller amounts of catalyst may be utilized however, if desired or necessary.

Various other ingredients may be added to the solvent solution before the solution is subjected to the drying process, providing such ingredients do not interfere with the subsequent operation of the process. Examples of suitable ingredients are dyes, stabilizers, plasticizers, and the like.

The polymer-monomer solvent solution preferably containing the polymerization catalyst dissolved therein is then projected in finely divided form into the relatively dry gas. The projection is preferably accomplished by applying pressure to the said solution and ejecting it out into a drying chamber as a fine spray. Other means of projecting the solution in finely divided form into the gas may also be employed.

The gas into which the polymer-monomer solvent solution is projected may be any suitable medium, such as air, carbon dioxide, nitrogen, helium, and the like. The gas employed should be relatively dry and heated to a relatively high temperature. The exact temperature employed will depend upon the particular heat-reactive polymer being dried, the contact time, etc. In general, the temperature of the gas at the time of contact with the solvent solution will vary between 50° C. and 240° C., preferably between 80° C. and 210° C., and more preferably between 75° C. and 100° C.

The apparatus employed for the drying process may be of any suitable construction. A preferred apparatus comprises a stainless steel drum having a spinner, rotating at about 12,000 R. P. M. positioned in the center thereof. The polymer-monomer solvent solution is ejected under pressure from the spinner as a fine spray and is immediately dried by the hot gases circulating in the drum. The powdered product is carried along by the escaping gas and is separated therefrom in a cyclone separator.

The products obtained from the process of the invention are substantially white powders, resembling flour. The powders are soluble and fusible indicating that they possess substantially the same state of cure as the original heat-reactive polymers. The catalyzed powders, i. e. those prepared from the polymer-monomer solvent solutions containing the polymerization catalyst, possess the active catalyst uniformly distributed through the polymer particles. Both types of powders may be dissolved in organic solvents, such as acetone, in the monomeric unsaturated esters, such as monomeric diallyl phthalate, and in other types of polymeric material, and may be used to produce improved varnishes, laminating solutions, impregnating compositions, and the like. The powders may also be mixed with catalysts, lubricants, dyes, and fillers, such as wood flour, alpha-cellulose, and asbestos, to produce superior molding powders. Moldings prepared from these powders, and particularly those prepared from the catalyzed powders, are characterized by their improved strength and the high degree of hardness.

The dry powders, including those which have been catalyzed, may be conveniently packed in paper bags or drums and shipped in a very safe and economical manner. The powders, including those which have been catalyzed, may also be stored in the open air or in closed containers without undergoing any apparent change in their state of cure or activity of the catalyst.

As described above the powdered polymers are particularly valuable in the production of improved laminates. Polymeric materials which have been utilized heretofore for the production of the laminates, such as the alkyd-styrene resins, possess the disadvantage of messy lay-up operations, costly clean-up and pitted surfaces in the product. The use of polymers of the above-described unsaturated esters of polycarboxylic acids in the solvent solution has also been unsatisfactory as it requires prolonged drying periods for the removal of the solvent. Many of these disadvantages may now be avoided by using the powdered polymers of the invention.

Various types of bibulous sheet material may be used in producing laminates from the above-described powders. Preferred sheet material is fibrous and flexible, e. g. paper, or knitted, woven or felted textile fabrics which may be made from vegetable fibers, such as those of cotton, hemp, jute, etc., fibers, animal fibers, such as those of wool, horse hair, alpaca, silk, etc., inorganic fibers, such as those of glass; or synthetic fibers, which may be derived from natural proteins of animal origin, e. g. casein, or vegetable origin, e. g. soybean meal, or from cellulose, as in the case of fibers of regenerated cellulose, cellulose acetate, cellulose aceto butyrate, etc. Another important class of fibers consists of those comprising synthetic resins, as represented by synthetic linear polyamides (the nylons), and interpolymers of vinyl halides with vinyl esters, e. g. Vinyon. Of these synthetic resins, thermoplastic resins capable of macromolecular orientation by cold drawing are preferred.

One method for using the powdered polymers in the preparation of laminates comprises mixing the dried polymer, preferably the catalyzed powder, with the monomeric unsaturated esters or liquid polymer-monomer solutions and spreading the resulting mixture upon the sheet material before the solid phase has dissolved in the liquid phase. The coated sheets may then be assembled and cured or may be stored indefinitely. Another method comprises spraying the monomeric unsaturated esters or polymer-monomer on the desired sheet material, coating with the powdered polymer and allowing to stand until solution of the two phases occurs and then assembling and curing. In this latter method an alternative procedure comprises sintering the powdered polymers after they have been added to the coated sheet material, adding more dried powder and then assembling and curing.

The laminated sheets may be cured at relatively low pressures, e. g. pressures below about 100 pounds per square inch, preferably pressures between 5 p. s. i. and 50 p. s. i. The pressure may be applied by means of platens of a press, by the mere positioning of a weight upon the upppermost layer or upon the backing plates of the horizontally positioned article, by properly spaced rolls, by spaced endless bands, or by fluid means, such as hydraulic pressure acting upon a flexible bag enclosing the article.

The temperatures employed in curing the laminates will vary considerably depending upon the particular polymer, type of sheet material, etc. In general, as a lower limit, the temperature need be only of such a degree that the final stage of the polymerization will occur. The upper limit is ordinarily dependent upon the decomposition or degradation of the components of the laminated articles. Preferred temperatures range from about 60° C. to 150° C.

Laminates produced by the above-described processes possess a very high degree of strength and hardness and may be utilized for a variety of purposes. They may be used in the construction of fuel tanks, canteens, and other portable or stationary containers. Some of the laminates may be used as stiffening materials in bandages, box toes and shoe counters. Military uses include the fabrication of protective helmets and scabbards. They are also valuable in the production of table tops, wall panels, containers for chemicals, and the like.

To illustrate the manner in which the invention may be carried out the following examples are given. It is to be understood, however, that the examples are for the purpose of illustration and the invention is not to be regarded as limited to any of the specific conditions recited therein.

*Example I*

Monomeric diallyl phthalate was heated with tertiary butyl hydroperoxide until the polymer content was about 27% by weight. The resulting mixture of monomer and soluble polymer was then extracted with methanol to produce a 95% polymer-5% monomer mixture. This mixture was diluted with acetone to produce a composition having 30% solids. Using a DeVilbis spray gun and 10 pounds per square inch air pressure the composition was sprayed into dry air at a temperature of about 80° C. The resulting product was a dry, substantially white powder which dissolved instantly in acetone and dissolved in a 28.5% polymer-monomer mixture on standing overnight.

*Example II*

A 95% polymer-5% monomer mixture produced as in Example I was diluted with acetone to produce a composition having 30% solids and 2% by weight of tertiary butyl perbenzoate was added thereto. Using a spray gun as in Example I this composition was sprayed into dry air at a temperature of about 80° C. The resulting product was a dry, substantially white catalyzed powder which dissolved in acetone and the polymer-monomer mixture.

Molding powder prepared from the above-described catalyzed powder gave a chip molding having a hardness of 56 Barcol, and good appearance.

*Example III*

A 95% polymer-5% monomer acetone mixture containing 2% by weight of tertiary butyl perbenzoate produced as in Example II was spray dried in a centrifugal drier comprising a stainless steel drum five feet in diameter and three feet high. The polymer-monomer composition was fed by gravity into a specially designed spinner, rotating at 12,000 R. P. M., positioned in about the center of the drier. The mixture emerged from the spinner as a fine spray and was almost immediately dried by hot, combustion gases at a temperature of about 425° F. which circulated in the drier. The powdered product, carried along by the escaping gas, was separated therefrom in a cyclone separator.

Screen analysis of the powder produced by the above-described method showed the following:

2% was retained by a 60-mesh screen (.0097 inch opening)
6% passed the 60-mesh screen but was retained on the 150-mesh screen (.0041 inch opening)
23% passed the 150-mesh screen but was retained on the 250-mesh screen
69% passed the 250-mesh screen (.0024 inch opening)

Some of the catalyzed powder produced above was redissolved in acetone and used in making laminates without the further addition of catalyst. A three ply duck laminate cured 10 minutes at 310° C. under 200 pounds per square inch had a hardness of 50 Barcol. A molding powder made from the above-described catalyzed powder gave an excellent chip molding.

The above-described catalyzed powder placed in paper bags showed no apparent change in cure or catalyst activity even after months of storage.

*Example IV*

A 95% polymer-5% monomer mixture produced as in Example I was diluted with acetone to produce a composition having 30% solids and then 2% by weight of 2,2-bis(tertiary butyl peroxy) butane was added thereto. The resulting composition was spray dried using a spray gun as in Example I. The resulting product was a dry, substantially white catalyzed powder which was used to produce excellent molding powders and laminated articles without the further addition of catalyst.

*Example V*

Monomeric dimethallyl phthalate is heated with 4% by weight of tertiary butyl hydroperoxide until the polymer content is about 27%. The resulting mixture of monomer and soluble polymer is then extracted with methanol to produce a 95% polymer-5% monomer mixture. This mixture is diluted with acetone to produce a composition having 40% solids and 2% by weight of 2,2-bis(tertiary butyl peroxy) butane is added thereto. The resulting composition is sprayed under pressure of about 10 p. s. i. into dry air at a temperature of about 90° C. The resulting product is a dry, substantially white powder which can be used to produce improved molding powders and laminates without the further addition of catalysts.

*Example VI*

Monomeric diethallyl tetrachlorophthalate is heated with tertiary butyl hydroperoxide until the polymer content is about 27%. The resulting mixture is extracted with ethanol to produce a 90% polymer-10% monomer mixture. This mixture is diluted with methyl ethyl ketone to produce a composition having 50% solids and then 2% by weight of tertiary butyl perbenzoate is added thereto. This mixture is sprayed under pressure into dry air at a temperature of about 85° C. The resulting product is a dry, white powder which can be used to produce improved molding compositions.

*Example VII*

Monomeric di-2-butenyl sebacate is heated with 2.5% hydrogen peroxide to produce a partial polymer mixture. This mixture is extracted with ethanol to produce a 90% polymer-10% monomer mixture and the resulting composition diluted with acetone to produce a composition having 45% solids. Two per cent by weight of tertiary hexyl perbenzoate is then added and the mixture sprayed into dry carbon dioxide at 100° C. The resulting product is a dry, white powder which may be used to produce improved molding powders.

*Example VIII*

Powdered polymeric diallyl phthalate containing 2% by weight of 2,2-bis(tertiary butyl peroxy) butane prepared as shown in Example IV was added to a mixture of 28.5% polymer-monomer catalyzed with 2% tertiary butyl perbenzoate so as to produce a mixture having a 85% polymer content. Immediately after its preparation the mixture was spread upon one side of a 8" x 8" piece of glass mat. The coating was then covered with a ply of glass mat of approximately equal size. The resin content of the assembly was 65% by weight of the total. This assembly was allowed to stand overnight. The second glass mat was removed temporarily for examination. The resin mixture was more or less homogeneous, tough, and had a shiny surface. A laminate was made by combining two such assemblies. Curing was effected at 310° C. under 25 p. s. i. for 10 minutes. The resulting laminate had excellent strength and hardness and a very shiny surface.

We claim as our invention:

1. A process for converting fusible, soluble poly(diallyl phthalate) into relatively dry finely divided solid particles which are still fusible and soluble, which comprises spraying a solution comprising (1) a mixture of 95% by weight of fusible, soluble poly(diallyl phthalate) and 5% by weight of monomeric diallyl phthalate which mixture has been diluted with acetone to form a solution having 30% solids, and (2) 0.1% to 4% by weight of the said polymer of tertiary butyl perbenzoate, in finely divided form into relatively dry air heated to a temperature between 50° C. and 240° C., and recovering the dry finely divided particles produced thereby.

2. A process for converting fusible, soluble poly(diallyl phthalate) into relatively dry finely divided solid particles which are fusible and soluble, which comprises spraying a solution comprising (1) a mixture of 95% by weight of fusible, soluble poly(diallyl phthalate) and 5% by weight of monomeric diallyl phthalate which mixture has been diluted with acetone to form a solution having 30% to 60% solids, and (2) 0.1% to 4% by weight of the said polymer of 2,2-bis(tertiary butyl peroxy) butane, in finely divided form into relatively dry air heated to a temperature between 80° C. and 210° C., and recovering the dry finely divided particles produced thereby.

3. A process for converting fusible, soluble poly(diallyl phthalate) into dry finely divided solid particles which are fusible and soluble, which comprises spraying a solution comprising (1) a mixture of 90% to 97% by weight of fusible, soluble poly(diallyl phthalate) and 10% to 3% by weight of monomeric diallyl phthalate which mixture has been diluted with acetone to form a solution having less than 60% solids, in finely divided form into relatively dry air heated to a temperature between 80° C. and 210° C., and recovering the dry finely divided particles produced thereby.

4. A process for converting fusible, soluble poly(diallyl phthalate) into relatively dry finely divided solid particles which are fusible and soluble, which comprises spraying a solution comprising (1) a mixture of 90% to 97% by weight of the fusible, soluble poly(diallyl phthalate) and 10% to 3% by weight of monomeric diallyl phthalate which mixture has been diluted with an organic volatile solvent to produce a solution having a solids content less than 60% and (2) 0.1% to 4% by weight of a peroxide polymerization catalyst, in finely divided form into a relatively dry gas heated to a temperature between 50° C. and 240° C., and recovering the dry finely divided particles produced thereby.

5. A process for converting a fusible, soluble polymer of an ester of a beta,gamma-mono-ethylenically unsaturated monohydric aliphatic alcohol containing from 3 to 10 carbon atoms and an aromatic dicarboxylic acid wherein the two carboxyl groups are attached directly to the aromatic ring and are both esterified with the aforedescribed unsaturated alcohol into relatively dry finely divided solid particles which are soluble and fusible, which comprises projecting a solution comprising (1) a mixture of 90% to 97% by weight of the fusible, soluble polymer and 10% to 3% by weight of the monomeric ester used in producing the said polymer which mixture has been diluted with a volatile organic solvent to produce a solution having a solids content less than 60%, and (2) a peroxide polymerization catalyst, in finely divided form into relatively dry gas heated to a temperature between 50° C. and 240° C.

6. A process for converting a fusible, soluble polymer of an ester of a beta,gamma-mono-ethylenically unsaturated monohydric aliphatic alcohol containing from 3 to 10 carbon atoms and an aromatic dicarboxylic acid wherein the two carboxyl groups are attached directly to the aromatic ring and are both esterified with the aforedescribed unsaturated alcohol into relatively dry finely divided solid particles which are soluble and fusible, which comprises projecting a solution comprising (1) a mixture of 90% to 97% by weight of the fusible, soluble polymer and 10% to 3% by weight of the monomeric ester used in producing the said polymer which mixture has been diluted with a volatile solvent to produce a solution having a solids content less than 60%, in finely divided form into relatively dry gas heated to a temperature between 50° C. and 240° C.

7. A process for converting a fusible, soluble polymer of an ester of an unsaturated alcohol possessing at least one ethylenic linkage not more than four carbon atoms removed from the hydroxyl group and a polycarboxylic acid wherein at least two of the carboxyl groups are esterified with the aforedescribed unsaturated alcohol into relatively dry finely divided solid particles which are substantially soluble and fusible, which comprises projecting a solution comprising a mixture of the said polymer and monomeric ester employed in the preparation of the polymer which solution contains at least 90% by weight of the said polymer and which has been diluted with a volatile organic solvent to form a solution having solids content less than 60%, in finely divided form into relatively dry gas heated to a temperature between 50° C. and 240° C.

8. A process for converting a fusible, soluble polymer of an ester of an unsaturated alcohol possessing at least one ethylenic linkage not more than four carbon atoms removed from the hydroxyl group and a polycarboxylic acid wherein at least two of the carboxyl groups are esterified with the aforedescribed unsaturated alcohol into relatively dry finely divided particles which are substantially soluble and fusible, which comprises projecting a solution comprising a mixture of the said fusible, soluble polymer and the monomeric ester employed in the preparation of the said polymer which solution contains at least 90% by weight of the polymer and which has been diluted with a volatile organic solvent to form a sprayable solution, in finely divided form into relatively dry gas heated to a temperature between 50° C. and 240° C.

9. A process for converting a fusible, soluble polymer of an ester of an unsaturated alcohol possessing at least one ethylenic linkage not more than four carbon atoms removed from the hydroxyl group and a polycarboxylic acid wherein at least two of the carboxyl groups are esterified with the aforedescribed unsaturated alcohol into relatively dry finely divided particles which are substantially soluble and fusible, which comprises projecting a solution comprising (1) a mixture of the said fusible, soluble polymer and the monomeric ester employed in the preparation of the said polymer which solution contains at least 90% by weight of the polymer and which has been diluted with a volatile organic solvent to form a sprayable solution, and (2) a peroxide polymerization catalyst, in finely divided form into relatively dry gas heated to a temperature between 50° C. and 240° C.

10. The process as defined in claim 9 wherein the peroxide catalyst is tertiary butyl perbenzoate.

11. The process as defined in claim 9 wherein the peroxide catalyst is a member of the group consisting of benzoyl peroxide, lauroyl peroxide, acetyl peroxide, benzoyl acetyl peroxide, tertiary butyl hydroperoxide, tertiary butyl perbenzoate, ditertiary butyl peroxide, hydrogen peroxide, cumene hydroperoxide, monochloro ditertiary butyl peroxide, dichloro ditertiary butyl peroxide, ditertiary amyl peroxide, tertiary butyl tertiary amyl peroxide, tertiary butyl peracetate, tertiary butyl ethyl percarbonate, 2,2-bis(tertiary butyl peroxy) butane, 2,2-bis(tertiary butyl peroxy) propane, and tertiary butyl perpelargonate.

12. The process as defined in claim 8 wherein the volatile organic solvent is acetone.

13. The process of claim 8 wherein the volatile organic solvent is a member of the group consisting of acetone, methyl ethyl ketone, methyl isobutyl ketone and diamyl ketone.

14. The process as defined in claim 8 wherein the relatively dry gas is heated to a temperature between 75° C. and 100° C.

15. The process as defined in claim 9 wherein the relatively dry gas is heated to a temperature between 75° C. and 100° C.

16. The process as defined in claim 8 wherein the soluble, fusible polymer is a polymer of a diester of a phthalic acid and a beta-gamma-monoethylenic monohydric aliphatic alcohol containing from 3 to 10 carbon atoms.

17. The process as defined in claim 9 wherein the amount of catalyst is 0.1% to 4% by weight.

18. The process as defined in claim 8 wherein the relatively dry gas is air.

19. The process as defined in claim 9 wherein the relatively dry gas is air.

FRANCIS C. HOPPER.
QUENTIN T. WILES.

REFERENCES CITED

The following references are of record in the file of this patent:

UNITED STATES PATENTS

| Number | Name | Date |
|---|---|---|
| 2,273,891 | Pollack et al. | Feb. 24, 1942 |
| 2,280,802 | Depew | Apr. 28, 1942 |
| 2,370,578 | Pollack et al. | Feb. 27, 1945 |

FOREIGN PATENTS

| Number | Country | Date |
|---|---|---|
| 604,544 | Great Britain | July 6, 1948 |